Patented Oct. 8, 1929

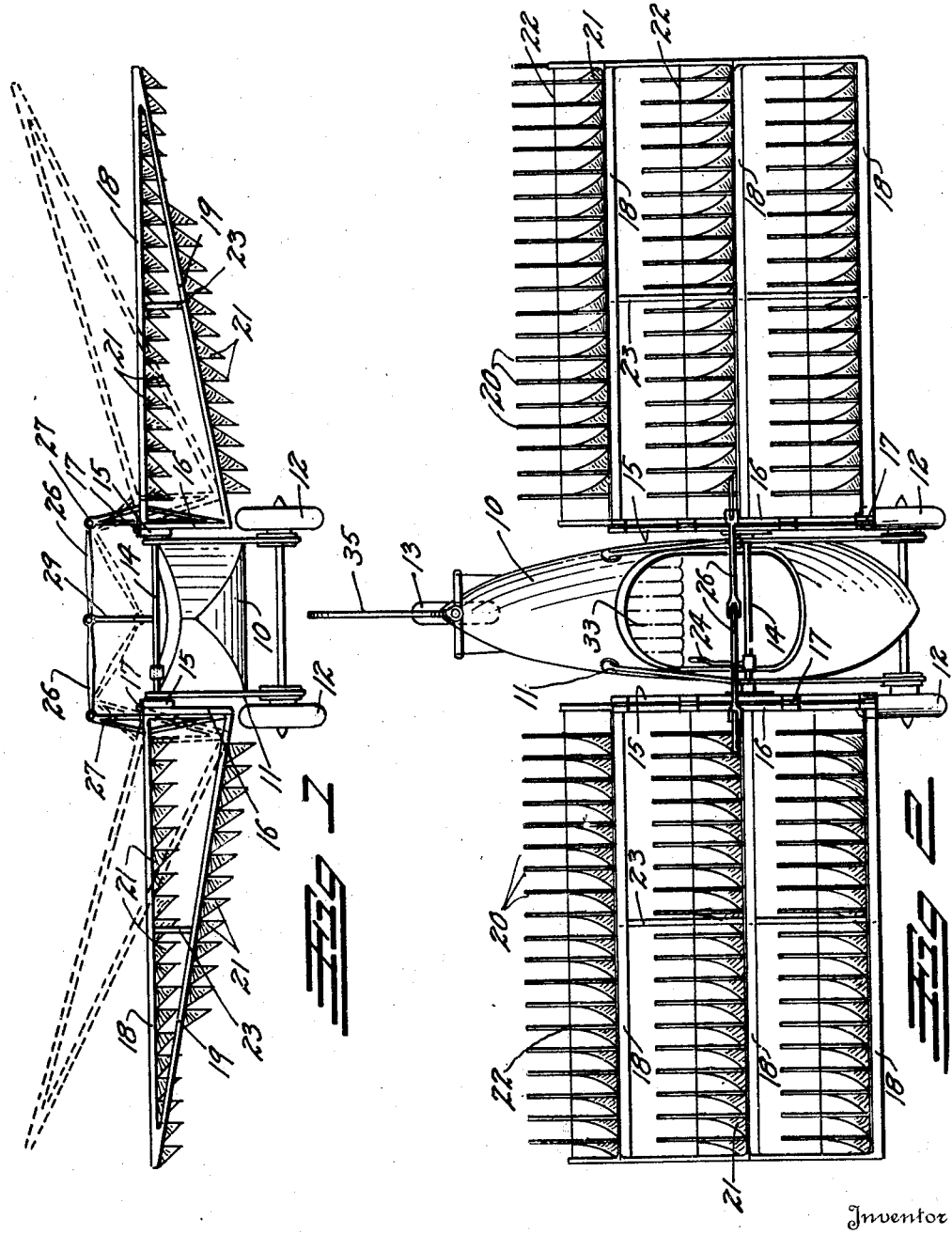

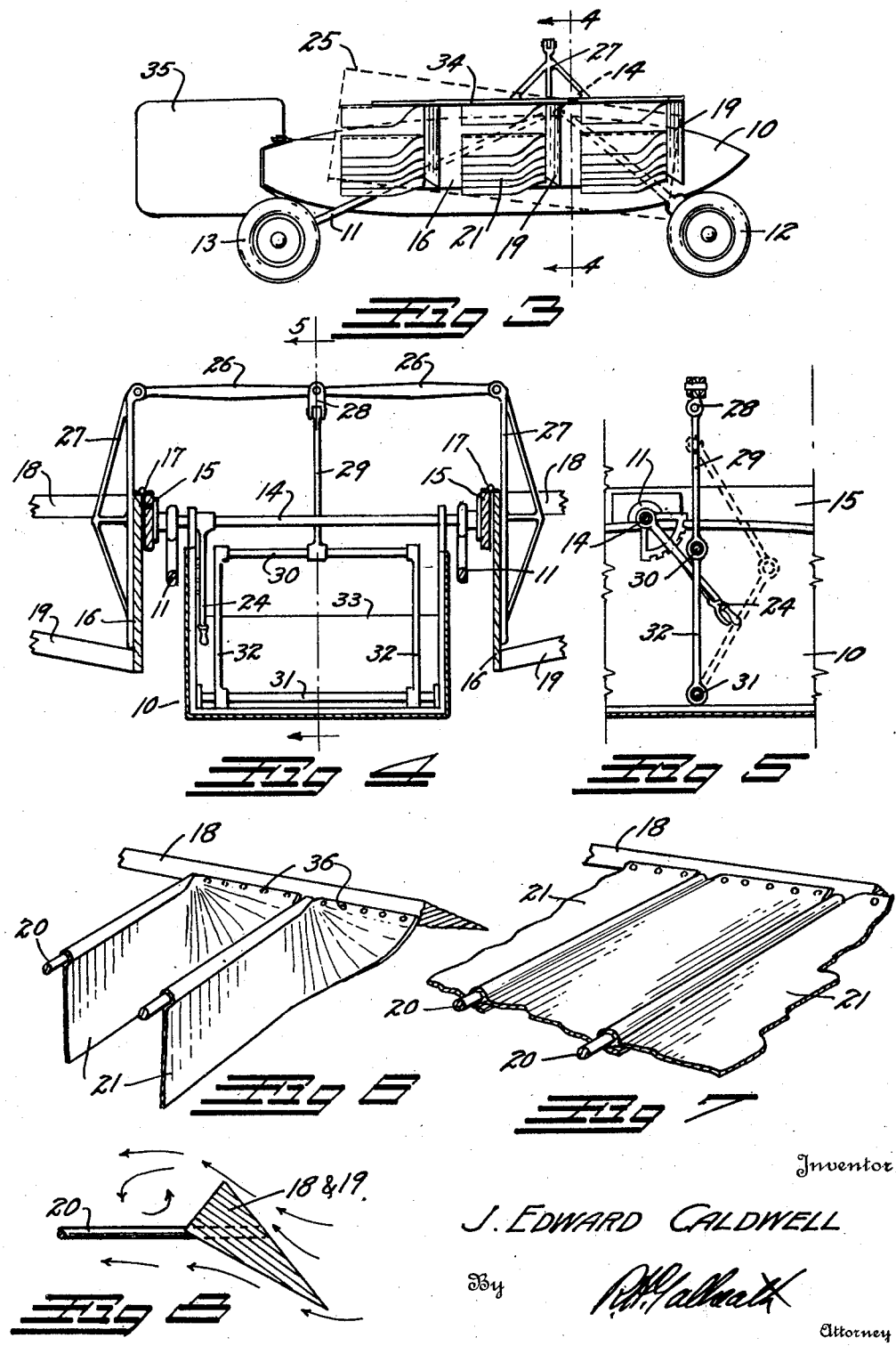

1,730,758

UNITED STATES PATENT OFFICE

JONATHAN EDWARD CALDWELL, OF DENVER, COLORADO

AIRPLANE

Application filed December 30, 1927. Serial No. 243,570.

This invention relates to an airplane more particularly to the type of airplane which is designed with movable wings to imitate bird flight.

The principal object of the invention is to provide a plane of this construction which will utilize the gliding angle of bird flight to full efficiency.

Another object of the invention is to provide an efficient construction whereby the wings can be flapped or oscillated with a minimum effort.

Another object of the invention is to provide a wing which will offer a minimum resistance to air passage as it rises and a maximum resistance as it falls.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front elevation of an airplane embodying the invention.

Fig. 2 is a plan view of the same.

Fig. 3 is a side elevation of the airplane of Fig. 1.

Fig. 4 is an enlarged detail cross section taken on the line 4—4, Fig. 3.

Fig. 5 is a detail longitudinal section taken on the line 5—5, Fig. 4.

Fig. 6 is a detail cross section through a portion of the wing structure, illustrating the vanes thereof in idle position.

Fig. 7 is a similar detail cross section through the wing structure illustrating the vanes in the resisting or flying position.

Fig. 8 is an enlarged detail cross section through one of the wing members.

The plane as illustrated comprises a fuselage 10 supported in a rigid frame structure 11 and carried on a pair of forward wheels 12 and a rear guide wheel 13. The frame structure 11 supports a wing shaft 14, on each extremity of which, is carried a parallel longitudinal member which we will designate as the wing frames 15. On the outer faces of the wing frames 15, wing boards 16 are placed, hinged along the top of the wing frame at 17.

Extending outwardly from each of the wing boards 16 is a series of triangular wing supporting members 18 supported at their outer extremities by wing braces 19 from the wing boards 16. Both the wing braces 19 and the wing members 18 carry a series of parallel, spaced, rods 20 from which depend flexible vanes or flaps 21 of canvas, doped silk, or other material. The flaps 21 are secured along the length of the rods 20, and at one end, are secured to the wing members 18.

Normally these flaps hang downwardly as illustrated in Figs. 1 and 6, but if the wing is forced downwardly or a draft of air forced upwardly against it, these flaps will swing toward one side until they contact with each other and with the rods 20 to form a solid resisting surface as shown in Fig. 7.

Taut wires 22 tie the rods 20 together substantially middleway of their length and prevent the flaps from passing between the rods 20. The free extremities of the rods are unsupported and flexible and can flex with the wind pressure to automatically form a gliding angle similar to the action of the tips of a bird's wing. The wing supporting members 18 are braced by cross trusses 23 and an end member 34, to which the wires 22 are fastened.

The wing supporting members 18 are parallel with each other, and lie in the same plane, but the angle of this plane with the ground can be changed by rotating the shaft 14 in the frame 11 by means of a lever 24 within reach of the operator to positions such as indicated in broken line 25, Fig. 3. This allows the angle of incidence of the wing structure to be changed at will to any desired gliding angle.

The wings are flapped, that is, raised, or lowered, at their outer extremities by means of a toggle construction. The toggle comprises two connecting rods 26 which connect with each other over the center of the fuselage and are connected at their outer extremities with levers 27 extending upwardly from the wing boards 16. At the point of connection of the levers 26, a universal joint 28 is provided, from which a rod 29 depends to an operating handle 30. The extremities of the operating handle are connected to a fixed floor rod 31 by means of links 32.

For hand operation, the rod 30 is grasped by the operator who is seated on a seat 33 in the fuselage. As the rod is drawn toward him, as indicated in broken line in Fig. 5, the rods 26 will be drawn inwardly and the extremities of the wings raised as indicated in broken line in Fig. 1. As the wings raise the flaps 21 will hang downwardly so that very little resistance is presented. The rod 30 is then forced forwardly bringing the wings back to their normal position. As they swing downwardly the flaps 21 will close, present resistance to the air, and raise the plane.

After the plane has left the ground, the lever 24 is adjusted so that the wing structure will tilt downwardly at its forward extremity, thus allowing the plane to glide, at all inactive moments of the wings. This gliding will support and propel the plane forwardly. The lifting component necessary for sustained flying will be furnished by the flapping action of the wings.

The plane is guided by means of any of the usual rudders, such as indicated at 35, which may be controlled by the feet of the operator or in any other desired manner.

The wing members 18 are preferably triangular in shape as illustrated in Fig. 8 with the rods 20 embedded therein. This shape creates a strong vacuum above the flaps 21 to assist in sustaining the plane in the air, as indicated in Fig. 8.

While the invention has been described as applied to manual operation, it is to be understood that any suitable engine might be employed to furnish the necessary driving power.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. An airplane comprising a frame; wings hinged to the side of said frame; means for raising and lowering said wings, said means comprising levers projecting from said wings; toggle links connecting said levers; means for reciprocating the connecting point of said toggle links, said means comprising a second series of toggle links fixedly connected at their one extremity, and a handle at the connecting point of said second series.

2. An airplane comprising a frame; a wing shaft arranged transversally of said frame and rotatable therein; parallel longitudinal members fixed to each extremity of said wing shaft; wings carried by said longitudinal member, and a lever adapted to rotate and hold said wing shaft in any desired position.

3. An airplane comprising a frame; a wing shaft arranged transversally of said frame and rotatable therein; parallel longitudinal members fixed to each extremity of said wing shaft; wings carried by said longitudinal member; a lever adapted to rotate and hold said wing shaft in any desired position; wing boards adapted to carry said wings and arranged parallel to said longitudinal members; hinges connecting said wing boards to said longitudinal members, and means for swinging said wing boards on their hinges.

4. An airplane comprising a frame; a wing shaft arranged transversally of said frame and rotatable therein; parallel longitudinal members fixed to each extremity of said wing shaft; wings carried by said longitudinal member; a lever adapted to rotate and hold said wing shaft in any desired position; wing boards adapted to carry said wings and arranged parallel to said longitudinal members; hinges connecting said wing boards to said longitudinal members; means for swinging said wing boards on their hinges, said means comprising levers projecting from said wing boards; links connected to said levers and to each other, and means for swinging the connecting point of said links.

5. An airplane wing comprising longitudinal wing members; parallel rods projecting from said wing members in spaced relation, and flexible flaps arranged to normally hang from said rods in one position and lie substantially parallel to the plane of said rods in another position, said flaps being connected to both said longitudinal members and said rods.

6. An airplane wing comprising longitudinal wing members; parallel rods projecting from said wing members in spaced relation; flexible flaps arranged to normally hang from said rods in one position and lie substantially parallel to the plane of said rods in another position, said flaps being connected to both said longitudinal members and said rods, and means for preventing said flaps from being forced between said rods comprising a wire stretched tightly across all of said rods.

7. In an airplane having a fuselage and wings; means for adjusting the angle of said wings with reference to said fuselage comprising a wing shaft arranged transversally of said fuselage and carrying said wings at each of its extremities, and means for rotating and maintaining said shaft in any desired position.

8. An airplane wing comprising longitudinal members, said members being triangular in cross section; rods projecting from the base corner of said triangular members in the same plane with each other; flaps carried by said rods and adapted, when said wing is inactive, to hang parallel to each other and, when said wing is active, to swing to a position parallel to the plane of said rods.

In testimony whereof, I affix my signature.

J. EDWARD CALDWELL.